(12) United States Patent
Kogan

(10) Patent No.: US 12,517,486 B2
(45) Date of Patent: Jan. 6, 2026

(54) CONTROL DEVICE HAVING A MONITORING UNIT

(71) Applicant: KUKA Deutschland GmbH, Augsburg (DE)

(72) Inventor: Yevgen Kogan, Augsburg (DE)

(73) Assignee: KUKA Deutschland GmbH (DE)

( * ) Notice: Subject to any disclaimer, the term of this patent is extended or adjusted under 35 U.S.C. 154(b) by 368 days.

(21) Appl. No.: 18/552,815

(22) PCT Filed: Mar. 28, 2022

(86) PCT No.: PCT/EP2022/058132
§ 371 (c)(1),
(2) Date: Sep. 27, 2023

(87) PCT Pub. No.: WO2022/207557
PCT Pub. Date: Oct. 6, 2022

(65) Prior Publication Data
US 2024/0184262 A1   Jun. 6, 2024

(30) Foreign Application Priority Data

Mar. 30, 2021   (DE) ..................... 10 2021 108 012.6

(51) Int. Cl.
*G05B 19/048* (2006.01)

(52) U.S. Cl.
CPC .. *G05B 19/048* (2013.01); *G05B 2219/50198* (2013.01)

(58) Field of Classification Search
CPC .................................................. G05B 19/048
See application file for complete search history.

(56) References Cited

U.S. PATENT DOCUMENTS 11,597,097 B2   3/2023   Riedel
2017/0212490 A1   7/2017   Hellmann et al.
(Continued)

FOREIGN PATENT DOCUMENTS

DE   102014110017 A1   1/2016
DE   102015206478 B3   8/2016
(Continued)

OTHER PUBLICATIONS

European Patent Office; Search Report in related International Patent Application No. PCT/EP2022/058132 dated Mar. 28, 2022; 5 pages.
(Continued)

*Primary Examiner* — Mark A Connolly
(74) *Attorney, Agent, or Firm* — Dorton & Willis, LLP

(57) ABSTRACT

A control device for controlling a machine or system includes a monitoring unit designed and configured to monitor the functional state of a second control unit such that, when the second control unit is in an activated functional state, by which the machine or system is put into a safe state, the monitoring unit connects at least one input means associated with the second control unit to a first control unit such that non-safety-relevant functions of the machine or system can be triggered by manual actuation of the input means, as long as the second control unit is in its activated functional state in which the input means is not connected to the machine or system as a proper safety switching means.

14 Claims, 4 Drawing Sheets

(56) References Cited

U.S. PATENT DOCUMENTS

2018/0258918 A1    9/2018  Enskonatus
2020/0313368 A1*  10/2020  Yau ..................... H01R 13/713

FOREIGN PATENT DOCUMENTS

| DE | 102015206571 B3 | 8/2016 |
| DE | 102016208811 B3 | 10/2017 |
| DE | 102017108316 A1 | 10/2018 |
| DE | 102019103643 A1 | 8/2020 |

OTHER PUBLICATIONS

German Patent Office; Search Report in related German Patent Application No. 10 2021 108 012.6 dated Dec. 20, 2021.

* cited by examiner

CONTROL DEVICE HAVING A MONITORING UNIT

CROSS-REFERENCE TO RELATED APPLICATIONS

This application is a national phase application under 35 U.S.C. § 371 of International Patent Application No. PCT/EP2022/058132, filed Mar. 28, 2022 (pending), which claims the benefit of priority to German Patent Application No. DE 10 2021 108 012.6, filed Mar. 30, 2021, the disclosures of which are incorporated by reference herein in their entirety.

TECHNICAL FIELD

The invention relates to a control device for controlling a machine or system, comprising a first control unit which is designed as non-safe technology and is configured to control at least one non-safety-relevant function of the machine or system, and comprises a second control unit which is designed as a safe technology and is configured to control at least one safety-relevant function of the machine or system, wherein the second control unit is connected to at least one input means associated with the second control unit as a safe technology, which input means is designed for manual actuation in order to trigger the safety-relevant function.

BACKGROUND

DE 10 2015 206 571 B3 describes a hand-held robot operating device comprising a basic safety control device, a mobile terminal, and a holder that is designed to secure the mobile terminal to the basic safety control device, wherein the holder comprises at least one adapter device that is designed to mechanically connect the mobile terminal to the basic safety control device; wherein the basic safety control device comprises a first hand-held operating device part and comprises at least one second hand-held operating device part adjustable with respect to the first hand-held operating device part; wherein the hand-held operating device parts are adjustably coupled to one another in such a way that the hand-held operating device parts, in a basic arrangement, form a hand-held robot operating device having a reduced contour and, in a receiver arrangement having expanded contours in which the second hand-held operating device part is arranged displaced out of the basic arrangement, away from the first hand-held operating device, the hand-held robot operating device is designed to receive the mobile terminal via the adapter device.

SUMMARY

The object of the invention is to achieve a control device for controlling a machine or system, via which control device the operating properties for controlling the machine or system are expanded.

The object is achieved by a control device for controlling a machine or system, comprising:
a first control unit which is designed as a non-safe technology and is configured to control at least one non-safety-relevant function of the machine or system,
a second control unit which is designed as a safe technology and is configured to control at least one safety-relevant function of the machine or system, wherein the second control unit is connected to at least one input means associated with the second control unit as a safe technology, which input means is designed for manual actuation in order to trigger the safety-relevant function via
a monitoring unit which is designed and configured to monitor the functional state of the second control unit in such a way that, in an activated functional state of the second control unit via which the machine or system is put into a safe state, the monitoring unit connects the at least one input means associated with the second control unit to the first control unit in such a way that, by manual actuation of the input means, non-safety-relevant functions of the machine or system can be triggered as long as the second control unit is in its activated functional state in which the input means is not connected to the machine or system as a proper safety switching means.

In a specific embodiment, the second control unit can comprise at least one second input means as an input means, wherein the first control unit comprises at least one first input means. Alternatively or additionally, the second control unit can be connected to an emergency stop switching means. Accordingly, the at least one second switching means can be an emergency stop switching means. As an alternative or in addition to an a emergency stop switching means, however, the second switching means can also be, for example, a monitoring means or sensor means arranged separately from the second control device, such as a safety laser scanner.

For each input means or switching means, in particular second input means, it can be indicated—for example by means of a lamp, such as a yellow or red LED, in spatial proximity to or directly at the relevant input means—whether the input means, which is connected to the first control unit or the second control unit, is, in its relevant manner of connection, in its functional operating state, in its non-functional operating state, and/or is connected to the second control unit in a safe mode of operation, that is to say in a safe manner, or is connected to the first control unit in non-safe mode of operation, i.e., as a safe technology.

The object is therefore achieved in particular, in a specific embodiment, by a control device for controlling a machine or system, comprising:
a first control unit which is designed as a non-safe technology and is configured to control at least one non-safety-relevant function of the machine or system, wherein the first control unit is connected to at least one first input means that is designed for manual actuation in order to trigger the non-safety-relevant function,
a second control unit which is designed as a safe technology and is configured to control at least one safety-relevant function of the machine or system, wherein the second control unit is connected to at least one second input means associated with the second control unit as a safe technology, which input means is designed for manual actuation in order to trigger the safety-relevant function, wherein the at least one second input means comprises at least one emergency stop switching means, characterized by
a monitoring unit which is designed and configured to monitor the functional state of the emergency stop switching means in such a way that, in an activated functional state of the emergency stop switching means via which the machine or system is put into a safe state, the monitoring unit connects the at least one second input means to the first control unit in such a way that, by manual actuation of the second input means, non-safety-relevant functions of the machine or system can be triggered as long as the emergency stop switching means is in its non-functional operating state in which it is not connected to a machine or system as a proper safety switching means.

The control device for controlling the machine or system can be combined in a single control apparatus. Alternatively, the control device can be distributed across a plurality of devices or a control housing. The control device can in particular be made up of a plurality of control units which are connected to a common control system. A connection of a plurality of control units can in particular mean that different control units are coupled via electrical connections, so that one control unit can communicate with another control unit in each case, in particular can transmit and/or receive data and/or signals, in particular can exchange data and/or signals. The control device can moreover comprise a local control unit which can be arranged so as to be stationary, and moreover can comprise a portable control unit which is portable or mobile, and in particular can be carried by a person from one location to another location. Depending on the individual embodiment, individual logical control components can optionally be designed in a local control unit or in a portable control unit. Different control units can thereby communicate with one another either by wire or wirelessly, in particular via a radio link.

The second control unit, which is designed as a safe technology, is a safety-related control system which meets the respective relevant safety standards. The relevant safety standards can be, in particular, ISO 13849-1 and IEC 62061-1. In the event of special machines and systems which comprise robots, ISO 10218-1 can moreover be used. The second control unit is in particular designed as a safe technology if function-critical components are redundantly present or even diversified. The second control unit, which is designed as a safe technology, is configured in particular to interrogate at least one switching state of an emergency stop switching means, an operating mode selector, and/or at least one enabling key, which can be one of the second input means in each case.

The emergency stop switching means is the essential switching element of an electrical emergency stop device or an emergency stop unit or an emergency stop switch. This generally comprises a manually actuated electrical switch which, when actuated by a person, serves to enable a machine or system associated with the emergency stop switching means to be brought into a safe state in a danger situation. For this purpose, the emergency stop switching means is connected to an electrical control device, that is to say the second control unit, which detects the switching states of the emergency stop device and, depending on said switching states, triggers an emergency stop functionality which brings the machine or the system into a safe state. Depending on the type and mode of operation of the machine or system, different emergency stop functionalities can be triggered.

Safety functions of electric drives are defined, for example in EN/IEC 61800-5-2, and comprise several types of safe operating stop such as, in particular, STO (Safe torque off), SS1 (Safe stop 1), and SS2 (Safe stop 2).

Safety stop functions of machines are generally defined in EN/IEC 60204-1, for example, and are designated there as stop category 0, stop category 1, and stop category 2, for example.

By means of the electrical emergency stop switching means, emergency stop functions of a machine or a system can thus be triggered, for example according to EN/IEC 61800-5-2 or EN/IEC 60204-1. For this purpose, the appertaining machine or the appertaining system can comprise a safety control device or be connected to such a safety control device, which in turn is connected to the corresponding electrical emergency stop device.

A specific example of machines that have to meet corresponding safety requirements are industrial robots which, according to DIN EN ISO 10218-1, must be equipped with an emergency stop device according to EN/IEC 60204-1 and DIN EN ISO 13850.

The enabling key is generally a three-stage switch which can have three different switching positions. In a central switching position, switching contacts of the enabling key are electrically closed, which corresponds to a switching state of the enabling key in which the machine or system can be put into operation or is in operation. The middle switching position is an unstable switching position, i.e., the enabling key has this switching position only when a person holds the enabling key, for example with a hand or at least one finger. By contrast, if the enabling key is released, then the enabling key automatically switches into its released switching position, in which the electrical switching contacts are open. In an open switching state, the machine or the system is immediately, automatically put into a safe state. In the third switching position of the enabling key, its actuating element is pushed through, i.e., the enabling key is then located in its pressed-through switching position. This means that the enabling key in its pressed-through switching position is actuated with a greater force than that force required for actuating the enabling key in its middle switching position. This third switching position ensures that, in a danger situation in which an operator of the machine or system panics and does not release the enabling key, but rather on account of a human reflex presses even more strongly than is necessary to put the machine or system into operation if the enabling key is to be held in its middle switching position, which is an unstable switch position. The enabling key can inasmuch be designed according to IEC 60947-5. The enabling key is to be designed as a safe technology in accordance with valid regulations.

The operating mode selector can be, for example, a multi-stage rotary knob and/or a key switch which can optionally be moved into one of several switching positions, wherein a predetermined, separate safety-relevant functionality is associated with each individual switching position of the operating mode selector. For example, given robots, it is possible to switch over between automatic operation, a first jog mode, and a second jog mode via the operating mode selector. Such an operating mode selector is designed as a safe technology according to valid regulations.

Further second input means can be not only manually operated manual keys or manual switches, but possibly also foot mats, door position sensors, or laser scanners, for example for intrusion protection, for example at hydraulic presses, which in safe technology each monitor defined states at the machine or the system.

The first control unit, which is designed as non-safe technology, represents a general control system which is designed only according to general rules of the technology and, in particular, does not meet the requirements that the respective relevant safety standards prescribe. The relevant safety standards can be, in particular, ISO 13849-1 and IEC 62061-1. In the event of special machines and systems which comprise robots, ISO 10218-1 can moreover be used. The first control unit is in particular designed as a non-safe technology when function-critical components are neither redundantly present nor diversified.

A control device to control a machine or system via which the operating properties for controlling the machine or system are expanded is achieved in that the control device in particular comprises a monitoring unit which is designed and configured to monitor the functional state of the emergency stop switching means in such a way that, in an activated functional state of the emergency stop switching means via which the machine or system is put into a safe state, the monitoring unit connects the at least one second input means to the first control unit in such a way that, by manual actuation of the second input means, non-safety-relevant functions of the machine or system can be triggered as long as the second control unit, in particular the emergency stop switching means, is in a non-functional operating state in which the input means is not connected as a proper safety switching means to a machine or system.

The monitoring unit can be part of the second control unit, or can be a control unit separate from the second control unit and/or the first control unit.

Regardless of whether or not it is already connected to the second control unit, the emergency stop switching means has, in an unactuated first operating position of its emergency stop operating part, a first switching state characterizing the non-activated functional state of the emergency stop switching means, and has, in an actuated second operating position of its emergency stop operating part, a second switching state characterizing the activated functional state of the emergency stop switching means. The emergency stop switching means can, for example, have electrical switching contacts which, for example, are open in the first switching state so that the emergency stop switching means interrupts a circuit, and which are closed in the second switching state so that the emergency stop switching means closes a circuit.

The functional operating state of the emergency stop switching means is characterized in particular in that, when the emergency stop operating part is actuated, that is to say when the activated functional state of the emergency stop switching means is initiated, the machine or system associated with the emergency stop switching means executes the desired or the required operating stop or emergency stop, if applicable as controlled by the second control unit.

However, if an emergency stop has already been triggered in the functional operating state of the emergency stop switching means, i.e., the emergency stop switching means is in the activated functional state, the machine or the system is in a safe state, i.e., the machine or system can no longer be put into operation by simple inputs without the emergency stop switching means not also being set again into its non-activated functional state. However, if the emergency stop switching means is already in the activated functional state and the machine or the system is in a safe state, the possibly present further second switching means (and also the emergency stop switching means itself) are no longer in the actually intended use. Therefore, according to the technical achievement according to the invention, these second switching means can be used for other purposes. This second, and inasmuch new, use can in particular be a use which does not necessarily need to be executed as safe technology. The second switching means, which in the safe stop of the machine or system have inasmuch lost their previous safety function, can now be used according to the invention in order to control other functions, in particular functions which are not designed as safe technology and which can be predefined and/or programmed or selected in advance. This is clearly described in the following using the example of an enabling key. However, the technical achievements described in this context can also be applied analogously, in terms of their functional content, to other second input means.

Since the associated machine or system is in a safe state when the emergency stop switching means has been activated, i.e., is in the emergency stop state, the original functionality of the enabling key is no longer provided in the sense of IEC 60947-5. If a machine operator, for example a programmer of a robot, now wants to implement changes to a robot program, for example if incorrectly programmed driving movements have been programmed for the robot, he would like to edit text in command lines of the robot program if necessary. For this purpose, it is typical that they wish to change between the lines of the robot program in order to activate a specific program line and edit it, i.e., to change its text. It can now be provided, for example, that the first control unit is configured such that a cursor in the lines of the robot program jumps to the next higher program line by manually pressing the enabling key. This is a novel functionality for the enabling key which is not a safety-relevant function, i.e., does not need to be designed as a safe technology. This novel functionality can be predetermined, i.e., programmed, in terms of control technology. Alternatively, this novel functionality can, for example, be furnished by the user or by the programmer themselves, or be selected from a number of several predetermined possible functionalities. Furthermore, it can be provided, for example, that the first control unit is additionally configured such that the cursor in the lines of the robot program jumps to the next lower program line by manually pressing through the enabling key. This is an additional second novel functionality for the enabling key which is not a safety-relevant function, i.e., does not need to be designed as a safe technology. This additional second novel functionality can be predetermined, i.e., programmed, in terms of control technology. Alternatively, this additional second novel functionality can, for example, be furnished by the user or by the programmer themselves, or be selected from a number of several predetermined possible functionalities. An alternative functionality may, for example, be a command for confirming an input, which in the general computer technology field is referred to as a "select" or "return" or "input." The jumping between program lines can be understood as a "next" command in the sense of the general computer technology field. Aside from the specific example of the jumping between program lines, a plurality of other programming functions are thus known to a person skilled in the art, which can be applied in this sense in order to associate a non-safety-relevant function with the second input means as long as the emergency stop switching means continues to be in its non-functional operating state, i.e., the machine or system is not in operation.

In general, however, an arbitrary search of a plurality of objects, with subsequent selection of a specific object in the sense of object-oriented programming, can take place with a newly furnished second input means. In terms of its programming representation, the object can thereby optionally be a virtual object, for example an element of a list, or can be associated with a real object such as a machine, in particular a robot.

Another example is a case presentation in which a portable hand-held operating device is controlled by a person within a system which comprises a plurality of machines, in particular robots, which hand-held operator device can optionally be associated with a specific machine or a specific robot. If the machine or the robot, which was previously connected to the operating hand-operated device in terms of safe control, is brought into a safe state by activating an emergency stop switching means of the portable hand-held operating device, one of the second input means of the portable hand-held operating device, for example its enabling key, can be used in order to switch the portable hand-held operating device, by means of a manual input, to this machine or another robot of the system, i.e., to initialize it in terms of control, so that the portable hand-held operating device connects, in terms of control, to one of the other machines or one of the other robots after the emergency stop of the one machine or of the one robot. For example, by repeatedly pressing (not pushing through) the enabling key, it is hereby possible to jump in order from one machine to a next machine, or from one robot to a next robot. If the machine or the robot that is jumped to, which is to be connected in terms of control technology to the hand-held operating device, precisely this machine or precisely this robot can be selected or activated, for example by pushing through (not merely pressing) the same enabling key, meaning that the hand-held operating device can actually be connected in terms of control technology to this machine or this robot.

After the actions for which the functionality of the re-dedicated second input means are concluded, the monitoring unit can again remove or take away the re-dedicated functionality from the second input means so that the appertaining second input means recovers its original safety-oriented functionality again.

A re-dedication (thus in accordance with the invention) of the functionality of a second input means as a general, in particular non-safety-oriented input means can be expedient in particular when the relevant input device or the appertaining operating device has only a few different input means, as is so in particular given an aforementioned hand-held robot operating device, for example as is described in DE 10 2015 206 571 B3.

The monitoring unit can be configured to transmit a signal to the first control unit when the second control unit, in particular the emergency stop switching means, is in its activated functional state, wherein the first control unit associates a predetermined function with the at least one second input means on the basis of the signal obtained from the monitoring device, in such a way that the associated function is executed when the at least one second input means is actuated manually.

In the event of the activated functional state of the second control unit, in particular of the emergency stop switching means, that is to say in the stopped state of the machine or system, the monitoring unit inasmuch induces that a different function, and in particular a non-safety-relevant function, is associated with the second input means, which was previously associated with a specific safety-relevant function. It can be provided that a non-safety-relevant function, i.e., inasmuch a novel function, is associated with only a single second input means. However, it can also be provided that a relevant non-safety-relevant function, i.e., inasmuch a new function, is associated with two or more second input means. For this purpose, one or more non-safety-relevant function types can be predetermined, from which either a manual selection can be made, from which a pre-selected, non-safety-relevant function type is automatically activated programmatically, a permanently stored non-safety-relevant function type is automatically activated. The non-safety-relevant function type can inasmuch comprise a largely arbitrary control command, or a plurality of control commands, which can be interpreted, i.e., recognized and executed, by the first control unit.

The non-safety-relevant function types can, for example, be or comprise program-related commands. For example, this can be a jump command, in the manner of a program-related "next" command, or can be an execution command, in the manner of a program-related "select" command, "enter" command, or "execute" command. In the sense of a "next" command, for example, the jump command can be used to change from a first menu of a graphical user interface of a hand-held operating device to another, second menu. In the sense of a jump command, a change can also be made from one menu item to another menu item within a menu of the graphical user interface of the hand-held operating device. In the sense of an "enter" command or "execute" command, a selected menu item can be activated, for example for its execution. This can take place, for example, via a further second input means in the sense of the invention.

The first control unit can be configured, in terms of programming, to associate a specific function, from a set of a plurality of different possible functions, with the at least one second input means. Such a configurable association can take place in that a desired function, which was previously selected or set or configured manually or programmatically, is automatically selected or initialized.

The association of a specific non-safety-relevant function type to a specific second input means can inasmuch be configurable. A user of the operating device, such as a robot programmer, can thus himself determine the desired behavior of the second input means after an activation of the emergency stop switching means. Alternatively, the behavior of the second input means after activation of the emergency stop switching means can be fixedly predetermined, for example at the factory, or can be implemented in the control unit according to the desires of the customer.

The at least one second input means can thus be formed on a separate hand-held operating device which is separate from the machine or the system and which also comprises the emergency stop switching means, which in its functional operating state is connected to the machine or the system in terms of control technology in order, in the connected state, to bring the machine or the system into a safe state when the emergency stop switching means is in its activated functional state, wherein the predetermined function is associated or will be directly associated with the at least one second input means in the activated functional state of the emergency stop switching means, so that the associated function can be triggered by the first control unit when the second input means is actuated manually after activation of the emergency stop switching means.

In the activated functional state of the emergency stop switching means, the machine or system is immediately shut down, i.e., stopped and secured against restarting, as is also prescribed by the relevant standards.

The at least one second input means can be an enabling switch of the hand-held operating device.

The first control unit can thereby be designed and configured to associate a predetermined first function with the at least one enabling key in the activated functional state of the second control unit, in particular of the emergency stop switching means, so that this associated first function is triggered if the enabling key is simply pressed, and to associate a predetermined second function, which differs from the first function, with the same enabling key so that the associated second function is triggered when the enabling key is pressed through.

As was already mentioned above, it can be provided, for example, that the first control unit is configured such that, by manually pressing the enabling key, a cursor in the lines of the robot program, or a marking which is formed by graphical, in particular color, emphasis of a line of the robot program, jumps to the next higher program line. Furthermore, it can be provided, for example, that the first control unit is additionally configured such that the cursor or the marking in the lines of the robot program jumps to the next lower program line by manually pressing through the enabling key. This is an additional second novel functionality for the enabling key which is not a safety-relevant function, i.e., does not need to be designed as a safe technology. If a selected or marked program line is to be optionally executed, edited, or stored, this can take place, for example, by pressing or pressing through a second existing enabling key which has been accordingly furnished by the first control unit with this non-safety-relevant, novel function.

The operating device can accordingly comprise a first enabling key and at least one further enabling key, and the first control unit can thereby be designed and configured to associate a predetermined first function with the first enabling key in the activated functional state of the second control unit, in particular of the emergency stop switching means, so that this associated first function is triggered if the enabling key is simply pressed; and/or a predetermined second function, which differs from the first function, is to be associated with the same enabling key so that, when the enabling key is pressed through, the associated second function is triggered; and the first control unit is designed and configured to associate a predetermined further function, which differs from the first function and the second function of the first enabling key, with the further enabling key in the activated functional state of the second control unit, in particular of the emergency stop switching means, so that this associated further function is triggered if the further enabling key is simply pressed or pressed through.

As an alternative or in addition to a re-use of the function of a enabling key or of a plurality of enabling keys, the at least one second input means can be an operating mode selector of the hand-held operating device, and the first control unit can thereby be designed and configured to associate a predetermined function with the at least one operating mode selector in the activated functional state of the second control unit, in particular of the emergency stop switching means, so that this associated function is triggered when the operating mode selector is manually switched over.

An exemplary associated novel functionality for such an operating mode selector can be such that a selection direction can be determined via the switching position of the operating mode selector. Thus, the functionality "move up" can be associated with a first switching position of the operating mode selector, and the functionality "move down" can be associated with a second switching position of the operating mode selector. These movement directions then predetermine how a cursor or a marking behaves on a graphical display when, for example, the enabling key is pressed in order to trigger the jump functionality, and specifically depending on the switching position of the operating mode selector, optionally in the sense of a cursor jump upward according to the first switching position of the operating mode selector, or in the sense of a cursor jump downward according to the second switching position of the operating mode selector.

The at least one second input means may optionally also be the emergency stop button of the hand-held operating device itself, wherein the first control unit can thereby be designed and configured to associate a predetermined function with the emergency stop switching means in the activated functional state of the emergency stop switching means, so that this associated function is triggered when the emergency stop switching means is actuated.

Regardless of the type of the second input means, an additional novel functionality may be configured in that a number of multiple manual actuations per predetermined time unit triggers a certain functionality. This can be realized, for example, in the sense of what is known as a "double click."

As was already mentioned with regard to exemplary embodiments, the machine can be a robot and/or the system can comprise a plurality of robots, wherein at least one of the robots can be activated by the operating device.

Specific embodiments of the invention are explained in more detail in the following descriptions with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
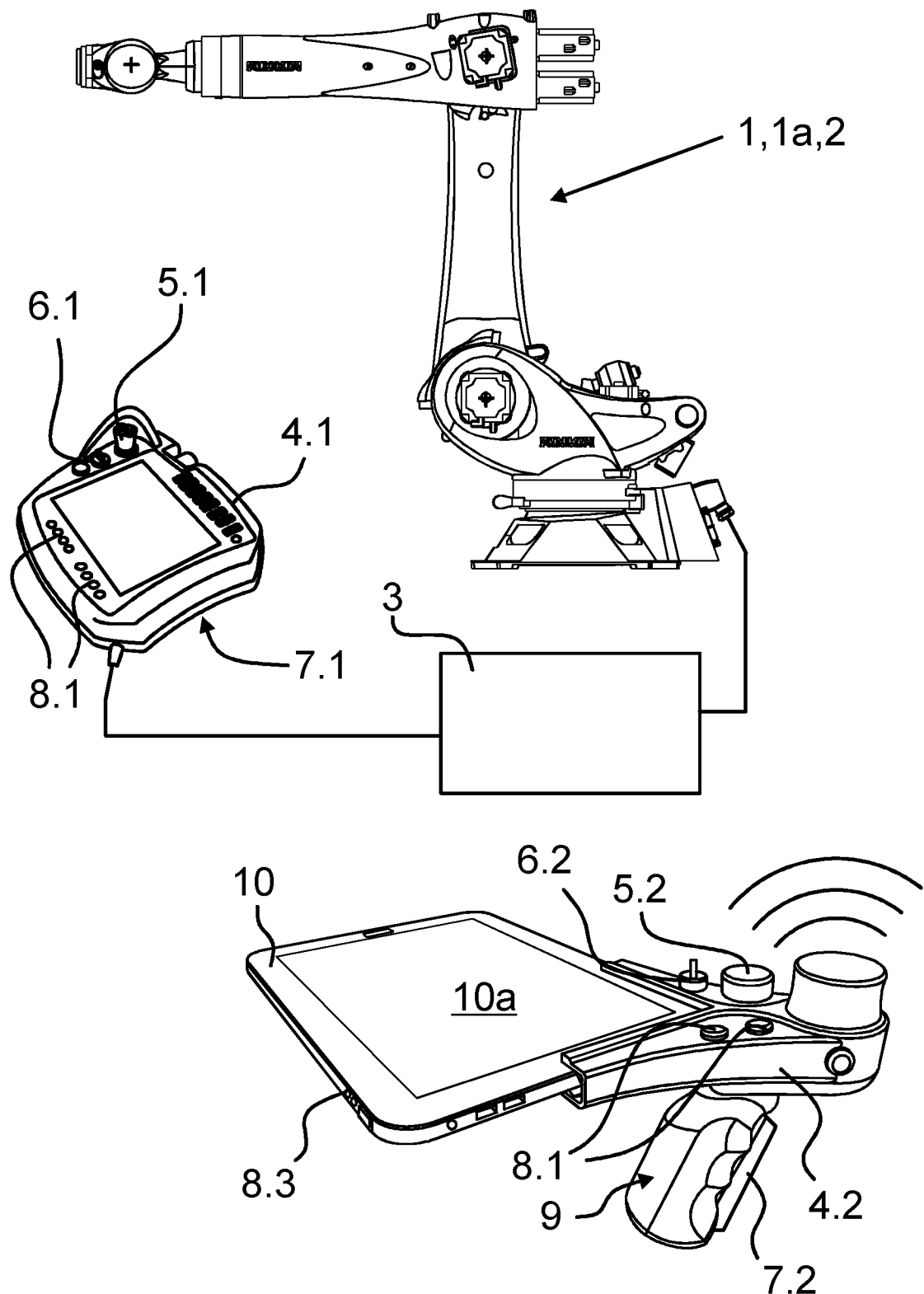
FIG. 1 shows an exemplary machine in the specific design of an industrial robot which comprises a control device to which a first hand-held operating device is connected by wire and with which a second hand-held operating device is engaged in a wireless connection to the control device.

Depicted in FIG. 1 is a robot 1a as a specific exemplary embodiment of a machine 1 or of a component of a system 2. The robot 1a comprises a control device 3 which is designed and configured to control the robot 1a and, in particular when an emergency stop is triggered, to automatically bring the robot 1a into a safe state, in particular to shut it down or halt it, i.e., to stop it. In the instance of the present exemplary embodiment, a first hand-held operating device 4.1 is connected by wire to the control device 3. The first hand-held operating device 4.1 is equipped with a first electrical emergency stop switching means 5.1, a first operating mode selector 6.1, and a plurality of enabling keys 7.1. The first hand-held operating device 4.1 moreover comprises a plurality of first input means 8.1 which are configured to trigger non-safety-relevant functions.

The machine 1 can accordingly be a robot 1*a*, in particular a robot 1*a* from a number of a plurality of robots of a system 2, wherein at least one of the robots 1*a* can be controlled by the hand-held operating device 4.1 and/or 4.2.

In the instance of the present exemplary embodiment, a wireless second hand-held operating device 4.2 is connected to the control device 3. The second hand-held operating device 4.2 is equipped with a second electrical emergency stop switching means 5.2, a second operating mode selector 6.2, and a plurality of enabling keys 7.2. Both the second emergency stop switching means 5.2, the second operating mode selector 6.2, and the plurality of enabling keys 7.2 form a second input means 8.2 of the hand-held operating device 4.2 in each case. The second hand-held operating device 4.2 optionally also comprises a plurality of first input means 8.1 which are configured to trigger non-safety-relevant functions. The second hand-held operating device 4.2 is a special embodiment which is designed in two parts and comprises a basic safety control device 9 designed as safe technology, plugged into which is a commercially available tablet computer 10 which is designed as non-safe technology. The tablet computer 10 can additionally comprise electro-mechanical input means 8.3 and/or software input means (what are known as touch keys) shown on a touchscreen 10*a* of the tablet computer 10

Figure 2:
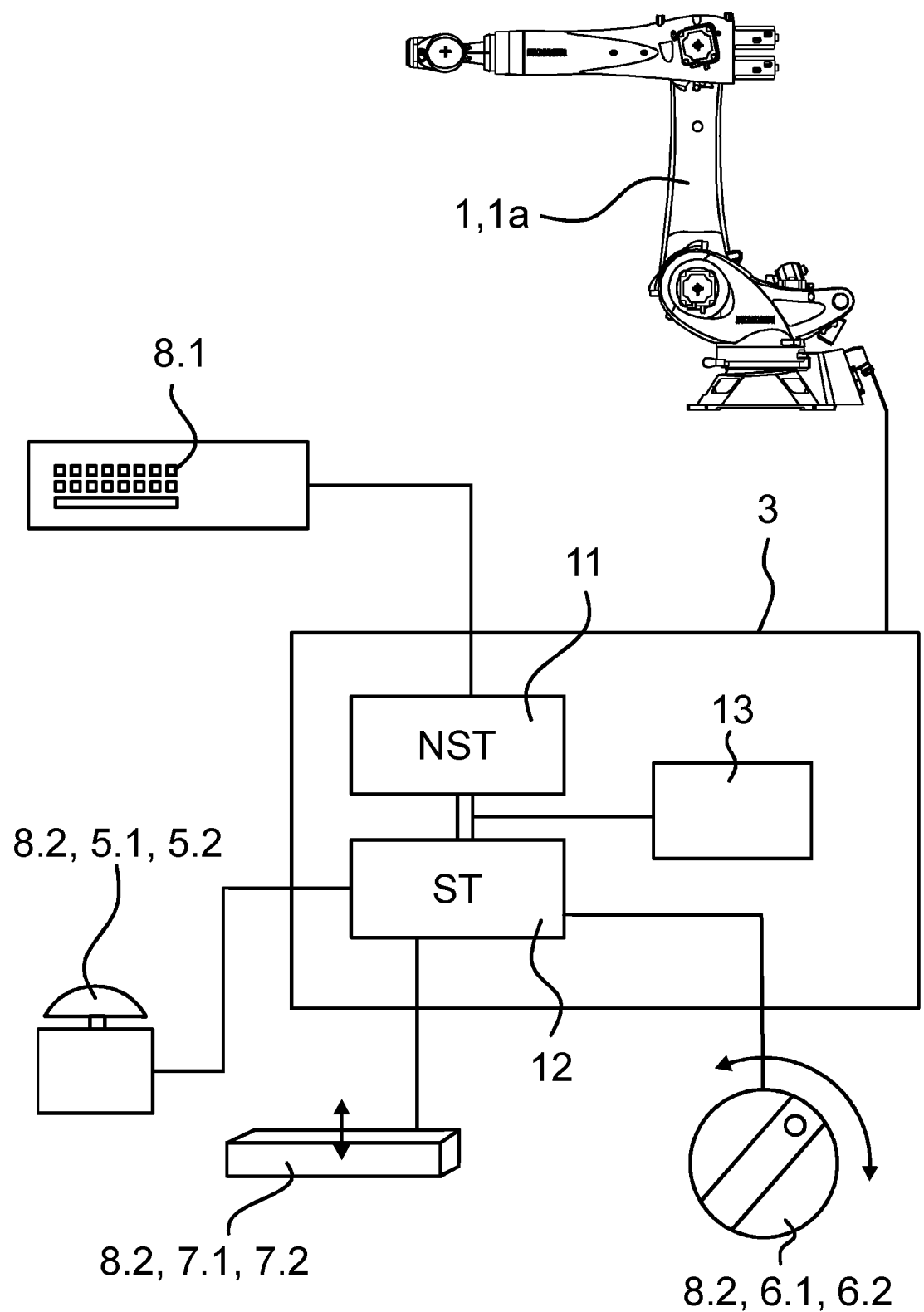
FIG. 2 shows a schematic representation of an exemplary control device according to the invention, in a general structure.

Accordingly, the at least one second input means 8.2 can be formed on a hand-held operating device 4.1, 4.2 separate from the machine 1 or from the system 2, which hand-held operating device 4.1, 4.2 also comprises the emergency stop switching means 5.1, 5.2 which, in terms of control technology, is connected in its functional operating state to the machine 1 or the system 2 in order, in the connected state, to bring the machine 1 or the system 2 into a safe state when the emergency stop switching means 5.1, 5.2 is in its activated functional state; and, in the activated functional state of the emergency stop switching means 5.1, 5.2, the predetermined function is associated with the at least one second input means 8.2 so that the associated function can be triggered by the first control unit 11 when the second input means 8.2 is actuated manually, which is shown in FIG. 2.

FIG. 2 shows the control device 3 for controlling the machine 1 or system 2. In the depicted exemplary embodiment, the control device 3 comprises:
- a first control unit 11 which is designed as a non-safe technology (NST) and is configured to control at least one non-safety-relevant function of the machine 1 or system 2, wherein the first control unit 11 is connected to at least one first input means 8.1 that is designed for manual actuation in order to trigger the non-safety-relevant function,
- a second control unit 12 which is designed as a safe technology (ST) and is configured to control at least one safety-relevant function of the machine 1 or system 2, wherein the second control unit 12 is connected to at least one second input means 8.2 as a safe technology, which input means 8.2 is designed for manual actuation in order to trigger the safety-relevant function, wherein the at least one second input means 8.2 comprises at least one emergency stop switching means 5.1, 5.2, characterized by
- a monitoring unit 13 which is designed and configured to monitor the functional state of the emergency stop switching means 5.1, 5.2 in such a way that the monitoring unit 13, in an activated functional state of the emergency stop switching means 5.1, 5.2 via which the machine 1 or system 2 is put into a safe state, connects the at least one second input means 8.2 to the first control unit 11 in such a way that, by manual actuation of the second input means 8.2, non-safety-relevant functions of the machine 1 or system 2 can be triggered as long as the emergency stop switching means 5.1, 5.2 is in its non-functional operating state in which it is not connected to a machine 1 or system 2 as a proper safety switching means.

In the instance of the present exemplary embodiment, the monitoring unit 13 is configured to transmit a signal to the first control unit 11 when the emergency stop switching means 5.1, 5.2 is in its activated functional state, and the first control unit 11 associates a predetermined function with the at least one second input means 8.2 on the basis of the signal obtained from the monitoring device 13, in such a way that the associated function is executed when the at least one second input means 8.2 is actuated manually.

The at least one second input means may thus also be the operating mode selector 6.1, 6.2 of the hand-held operating device 4.1, 4.2, wherein the first control unit 11 is designed and configured to associate a predetermined function with the at last one operating mode selector 6.1, 6.2 in the activated functional state of the emergency stop switching means 5.1, 5.2, so that this associated function is triggered when the operating mode selector 6.1, 6.2 is manually switched.

Alternatively or additionally, the at least one second input means 8.2 can optionally even be the emergency stop button 5.1, 5.2 of the hand-held operating device 4.1, 4.2 itself, wherein the first control unit 11 is designed and configured to associate a predetermined function with the emergency stop switching means 5.1, 5.2 or another emergency stop switching means 5.1, 5.2 of another hand-held operating device 4.1, 4.2 in the activated functional state of the emergency stop switching means 5.1, 5.2, so that the associated function is triggered when this emergency stop switching means 5.1, 5.2 is actuated.

Figure 3:
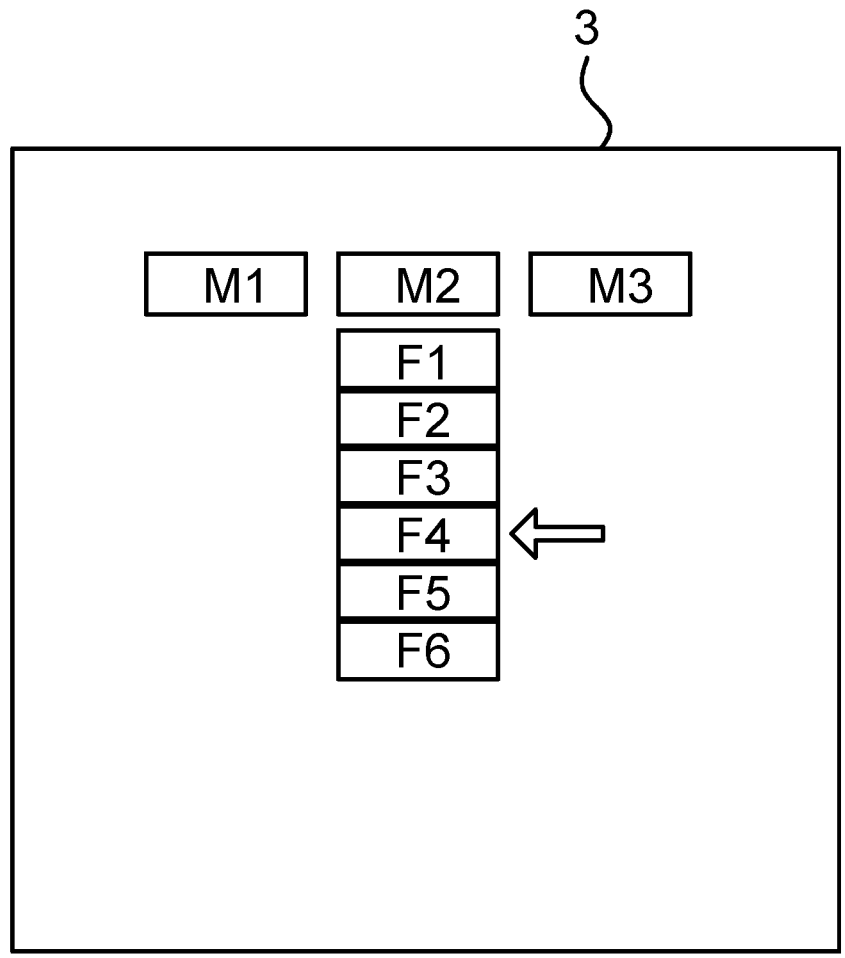
FIG. 3 shows a schematic representation of the first control unit, which is configured, in terms of programming, to associate a specific function, from a set of a plurality of different possible functions, with the at least one second input means.

As shown schematically in FIG. 3, the first control unit 11 can thereby be configured, in terms of programming, to associate a specific function (F4), from a set of a plurality of different possible functions (F1 to F6), with the at least one second input means 8.2 when the specific function (F4) has been selected manually or automatically as controlled by a program.

The first control unit 11 can be designed and configured to associate a predetermined first function with the at least one enabling key 7.1, 7.2 in the activated functional state of the emergency stop switching means 5.1, 5.2, so that this associated first function is triggered if the enabling key 7.1, 7.2 is simply pressed, and to associate a predetermined second function, which differs from the first function, with the same enabling key 7.1, 7.2 so that the associated second function is triggered when the enabling key 7.1, 7.2 is pushed through.

Figure 4:
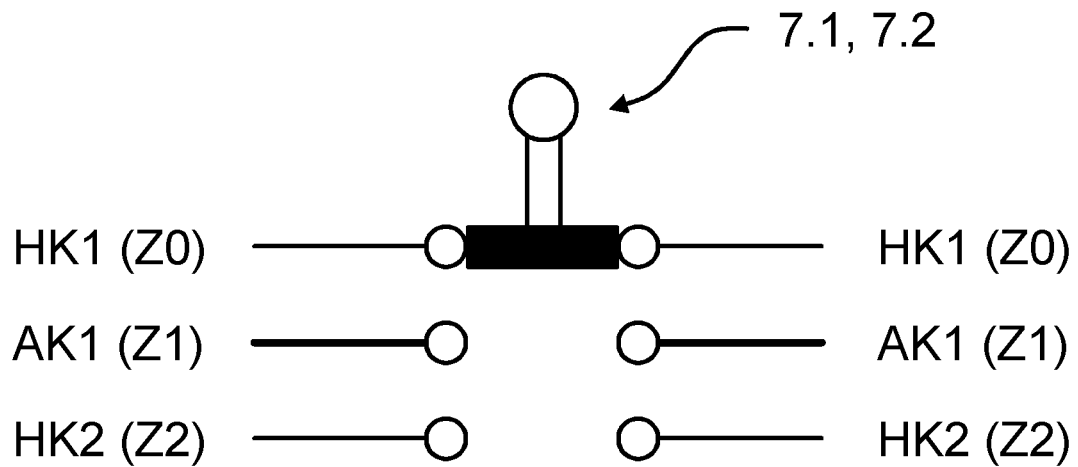
FIG. 4 shows a symbolic representation of an electrical circuit diagram of an exemplary three-stage enabling key with working contacts and auxiliary contacts.

In order to achieve this functionality, the circumstance can be utilized that three-stage enabling keys 7.1, 7.2 in conventional designs—in addition to their electrical working contacts AK1, which are connected in such a way that they are closed in the pressed state Z1 and are opened both in the non-pressed state Z0 and in the depressed state Z2—also have auxiliary contacts HK1, HK2 which, due to their individual switching configurations, allow an electrical querying which makes it possible to determine whether the enabling key 7.1, 7.2 is in its non-depressed state Z0 or is in its pressed-through state Z2. This is schematically shown in FIG. 4.

Figure 5:
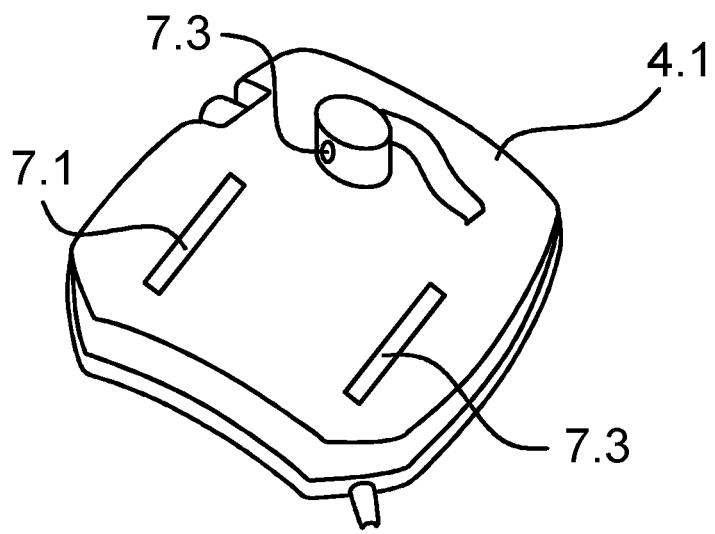
FIG. 5 shows a perspective representation from below of the wired first hand-held operating device according to FIG. 1, with a first enabling key and a further enabling key.

The operating device 4.1, 4.2 can comprise a first enabling key 7.1 and at least one further enabling key 7.2, as this is shown in particular in FIG. 5, wherein the first control unit 11 is designed and configured to associate a predetermined first function with the first enabling key 7.1 in the activated functional state of the emergency stop switching means 5.1, 5.2, so that this associated first function is triggered if the first enabling key 7.1 is simply pressed; and/or a predetermined second function, which differs from the first function, is to be associated with the same enabling key 7.1 so that, when the first enabling key 7.1 is pressed through, the associated second function is triggered; and the first control unit 11 is designed and configured to associate a predetermined further function, which differs from the first function and the second function of the first enabling key 7.1, with the further enabling key 7.3 in the activated functional state of the emergency stop switching means 5.1, 5.2, so that this associated further function is triggered if the further enabling key 7.3 is simply pressed or pressed through.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A control device for controlling a machine or system, the control device comprising:
   a first control unit which is designed as a non-safe technology and is configured to control at least one non-safety-relevant function of the machine or system;
   a second control unit which is designed as a safe technology and is configured to control at least one safety-relevant function of the machine or system;
   wherein the second control unit is connected to at least one input means associated with the second control unit as a safe technology, the at least one input means designed for manual actuation in order to trigger the at least one safety-relevant function; and
   a monitoring device designed and configured to monitor the functional state of the second control unit in such a way that, in an activated functional state of the second control unit by which the machine or system is put into a safe state, the monitoring device connects the at least one input means to the first control unit in such a way that, by manual actuation of the input means, non-safety-relevant functions of the machine or system can be triggered while the second control unit is in its activated functional state in which the input means is not connected to the machine or system as a proper safety switching means.

2. The control device of claim 1, wherein:
   the monitoring device is configured to transmit a signal to the first control unit when the second control unit is in the activated functional state; and
   in response to the signal, the first control unit associates a predetermined function with the at least one second input means such that the associated function is executed when the at least one second input means is actuated manually.

3. The control device of claim 2, wherein the second control unit is an emergency stop switching means.

4. The control device of claim 2, wherein the first control unit is configured, in terms of programming, to associate a specific function from a set of a plurality of different possible functions with the at least one second input means.

5. The control device of claim 1, wherein:
   the at least one second input means is formed on a hand-held operating device that is separate from the machine or from the system; and
   the hand-held operating device comprises an emergency stop switching means which, in terms of control technology, is connected in its functional operating state to the machine or the system such that:
      in the connected state, the emergency stop switching means brings the machine or the system into a safe state when the emergency stop switching means is in its activated functional state, and
      in the activated functional state of the emergency stop switching means, the predetermined function is associated with the at least one second input means so that the associated function can be triggered by the first control unit when the second input means is actuated manually after activation of the emergency stop switching means.

6. The control device of claim 5, wherein the at least one second input means is an enabling switch of the hand-held operating device.

7. The control device of claim 6, wherein:
   the first control unit is designed and configured to associate a predetermined first function with the at least one enabling switch in the activated functional state of the second control unit, so that the associated first function is triggered in response to the enabling switch being partly pressed; and
   the first control unit is designed and configured to associate a predetermined second function, which differs from the first function, with the same enabling switch so that the associated second function is triggered in response to the enabling switch being fully pressed.

8. The control device of claim 7, wherein the second control unit is an emergency stop switching means.

9. The control device of claim 6, wherein:
   the hand-held operating device comprises a first enabling switch and at least one second enabling switch;
   the first control unit is designed and configured to at least one of:
      associate a predetermined first function with the first enabling switch in the activated functional state of the second control unit, so that the associated first function is triggered in response to the first enabling switch being partly pressed, or
      associate a predetermined second function, which differs from the first function, with the first enabling switch so that, in response to the first enabling switch being fully pressed, the associated second function is triggered; and
   the first control unit is designed and configured to associate a predetermined third function, which differs from the first function and the second function of the first enabling switch, with the at least one second enabling switch in the activated functional state of the second control unit, so that this associated third function is triggered if the at least one second enabling switch is partly pressed or fully pressed.

10. The control device of claim 9, wherein the second control unit is an emergency stop switching means.

11. The control device of claim 5, wherein:

the at least one second input means is an operating mode selector of the hand-held operating device; and the first control unit is designed and configured to associate a predetermined function with the at last one operating mode selector in the activated functional state of the second control unit, so that the associated function is triggered when the operating mode selector is manually switched.

12. The control device of claim 11, wherein the second control unit is an emergency stop switching means.

13. The control device of claim 5, wherein:

the at least one second input means is the emergency stop switching means of the hand-held operating device itself; and the first control unit is designed and configured to associate a predetermined function with the emergency stop switching means in the activated functional state of the emergency stop switching means, so that the associated function is triggered when this emergency stop switching means is actuated.

14. The control device of claim 5, wherein at least one of:

the machine is a robot; or the system comprises a plurality of robots, and at least one of the robots is controllable via the hand-held operating device.

* * * * *